United States Patent
Kim et al.

(10) Patent No.: US 7,961,620 B2
(45) Date of Patent: Jun. 14, 2011

(54) NETWORK SCHEDULER FOR SELECTIVELY SUPPORTING WORK CONSERVING MODE AND NETWORK SCHEDULING METHOD THEREOF

(75) Inventors: Chei-Yol Kim, DaeJeon (KR); Dong-Jae Kang, DaeJeon (KR); Kang-Ho Kim, DaeJeon (KR); Sung-In Jung, DaeJeon (KR); Myung-Joon Kim, DaeJeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 175 days.

(21) Appl. No.: 12/201,752

(22) Filed: Aug. 29, 2008

(65) Prior Publication Data

US 2009/0154351 A1 Jun. 18, 2009

(30) Foreign Application Priority Data

Dec. 14, 2007 (KR) .................. 10-2007-0131394

(51) Int. Cl.
*H04L 12/26* (2006.01)
(52) U.S. Cl. ........ 370/235; 370/329; 370/311; 370/450; 370/468
(58) Field of Classification Search .............. 370/232, 370/235, 311, 318, 328, 329, 333, 342, 413, 370/450, 462, 468; 709/223, 224
See application file for complete search history.

(56) References Cited

U.S. PATENT DOCUMENTS

| | | | | |
|---|---|---|---|---|
| 6,345,040 | B1 * | 2/2002 | Stephens et al. | 370/232 |
| 6,463,044 | B1 * | 10/2002 | Seo | 370/329 |
| 6,675,209 | B1 * | 1/2004 | Britt | 709/224 |
| 7,508,780 | B2 * | 3/2009 | Zhang et al. | 370/311 |
| 2003/0223369 | A1 | 12/2003 | Anderson | |
| 2005/0048983 | A1 * | 3/2005 | Abraham et al. | 455/452.1 |
| 2005/0120102 | A1 * | 6/2005 | Gandhi et al. | 709/223 |

FOREIGN PATENT DOCUMENTS

| | | |
|---|---|---|
| JP | 2004-336549 | 11/2004 |
| JP | 2005-236669 | 9/2005 |
| KR | 10-2005-0099241 | 10/2005 |
| KR | 10-0689732 | 2/2007 |

OTHER PUBLICATIONS

Korean Office Action in corresponding Korean patent application.

* cited by examiner

*Primary Examiner* — Andrew Lai
(74) *Attorney, Agent, or Firm* — Staas & Halsey LLP

(57) ABSTRACT

Provided are a network scheduler and a network scheduling method capable of effectively managing network bandwidths by selectively supporting a work conserving mode to network entities by using an improved token bucket scheme. The network scheduler selectively supports a work conserving mode to network scheduling units (NSUs) serving as network entities by using a token bucket scheme, such that the network scheduler ensures an allocated network bandwidth or enables the NSUs to use a remaining bandwidth. The network scheduler manages the NSUs by classifying the NSUs into a green state, a red state, a yellow state, and a black state according to a token value, a selection/non-selection of the work conserving mode, and an existence/non-existence of the packet request to be processed.

15 Claims, 2 Drawing Sheets

NETWORK SCHEDULER FOR SELECTIVELY SUPPORTING WORK CONSERVING MODE AND NETWORK SCHEDULING METHOD THEREOF

CROSS-REFERENCE TO RELATED APPLICATIONS

This application claims priority under 35 U.S.C. §119 to Korean Patent Application No. P2007-131394, filed in Korea on Dec. 14, 2007, the disclosure of which is incorporated herein by reference in its entirety.

BACKGROUND OF THE INVENTION

1. Field of the Invention

The present disclosure relates to a network scheduler and a network scheduling method thereof, and more particularly, to a network scheduler for effectively managing network bandwidths by selectively supporting a work conserving mode to network entities using an improved token bucket scheme, and a method for limiting network bandwidths in the network scheduler.

This work was supported by the IT R&D program of MIC/IITA [Work Management Number: 2005-S-119-03, The development of open S/W Fundamental Technology]

2. Description of the Related Art

The terminology "network traffic control technology" is generally used in a variety of fields associated with network. A traffic control technology is widely used in a variety of communication fields. The traffic control technology often refers to a technology that enhances an overall network performance by appropriately controlling traffics in a gateway or a router according to situations of a current network traffic.

In addition to a network quality of service (QoS) management technology used in a gateway or a router, a rate limit technology has been proposed which enables a manager to control a network environment. The most famous rate limit technology is a token bucket algorithm. According to the token bucket algorithm, a certain amount of tokens corresponding to a bandwidth is supplied to each entity intending to limit a network bandwidth at constant intervals. When the current remaining tokens are enough to process a packet intended to process, a network scheduling unit (NSU) processes the corresponding packet. On the other hand, when the current remaining tokens are insufficient, the NSU waits until it is refilled with tokens. In this way, the NSU uses a designated network bandwidth.

According to the token bucket algorithm, since an NSU cannot use a bandwidth exceeding the designated bandwidth, an unused idle bandwidth of other NSU is wasted. That is, assuming that 10-Mbps bandwidths are allocated to NSUs A and B, even though the NSU A merely uses 5-Mbps bandwidth, the NSU B cannot use an unused 5-Mbps bandwidth of the NSU A. In some cases, it may be necessary to statically allocate specific network bandwidths to the respective NSUs. However, like the above-described case, there is also a case that it may be necessary to borrow an idle bandwidth of other NSU.

SUMMARY

Therefore, an object of the present invention is to provide a network scheduler, which is capable of effectively managing network bandwidths by selectively supporting a work conserving mode to networking entities by using an improved token bucket scheme, a network scheduling method thereof, and a recording medium storing a program for executing the network scheduling method.

Another object of the present invention is to provide a network scheduler, which is capable of enhancing the efficiency of network resources by efficiently distributing network bandwidths without their waste, while reflecting a manager's intention, thereby improving an overall system performance, a network scheduling method thereof, and a recording medium storing a program for executing the network scheduling method.

Another object of the present invention is to provide a network scheduler, which is capable of enabling a manager to control a network environment by limiting network bandwidths of network entities according to a user's purpose or intention, a network scheduling method, and a recording medium storing a program for executing the network scheduling method.

To achieve these and other advantages and in accordance with the purpose(s) of the present invention as embodied and broadly described herein, there is provided a network scheduler, characterized in that the network scheduler selectively supports a work conserving mode to network scheduling units (NSUs) serving as network entities by using a token bucket scheme, such that the network scheduler ensures an allocated network bandwidth or enables the NSUs to use a remaining bandwidth; and the network scheduler manages the NSUs by classifying the NSUs into a green state, a red state, a yellow state, and a black state according to a token value, a selection/non-selection of the work conserving mode, and an existence/non-existence of the packet request to be processed.

To achieve these and other advantages and in accordance with the purpose(s) of the present invention, a network scheduling method in accordance with another aspect of the present invention includes: reading an NSU of a green state from a green list, refilling the read NSU with tokens, extracting a packet request from the read NSU, and processing the extracted packet request; moving an NSU selecting a work conserving mode to a yellow list according to a token value; reading an NSU of a yellow state from a yellow list, refilling the read NSU with tokens, extracting a packet request from the read NSU, and processing the extracted packet request; moving the corresponding NSU to a red list or changing the corresponding NSU to the green state according to a token value and a release/non-release of the selected work conserving mode of the NSU; moving an NSU, which do not select the work conserving mode, to a red list according to the token value.

To achieve these and other advantages and in accordance with the purpose(s) of the present invention, there is provided a recording medium storing a program for executing a network scheduling method including: reading an NSU of a green state from a green list, refilling the read NSU with tokens, extracting a packet request from the read NSU, and processing the extracted packet request; moving an NSU selecting a work conserving mode to a yellow list according to a token value; reading an NSU of a yellow state from a yellow list, refilling the read NSU with tokens, extracting a packet request from the read NSU, and processing the extracted packet request; moving the corresponding NSU to a red list or changing the corresponding NSU to the green state according to a token value and a release/non-release of the selected work conserving mode of the NSU; moving an NSU, which do not select the work conserving mode, to a red list according to the token value.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incor

DETAILED DESCRIPTION OF EMBODIMENTS

Hereinafter, specific embodiments will be described in detail with reference to the accompanying drawings.

Figure 1:
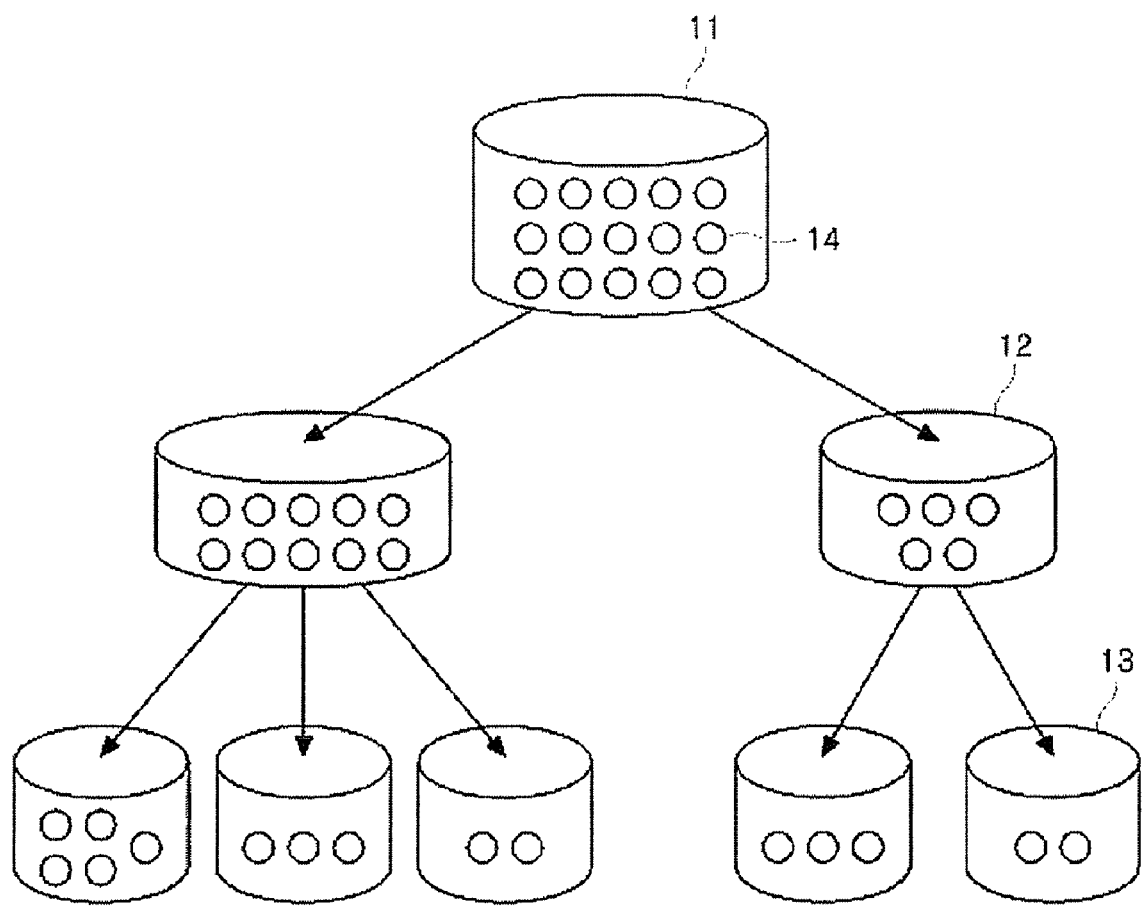
- FIG. 1 illustrates an architecture of a hierarchical token bucket (HTB) supporting a work conserving mode.

FIG. 1 illustrates the architecture of a hierarchical token bucket (HTB) supporting a work conserving mode.

Referring to FIG. 1, the HTB has a hierarchical structure that distributes token buckets used in a token bucket algorithm according to network bandwidths, and supports a work conserving mode through the hierarchical structure. The HTB includes parent buckets 11 and 12, child buckets 13, and tokens 14.

The parent buckets 11 and 12 supply the tokens 14 to the last child buckets 13 in the hierarchical structure. The child buckets 13 can transmit packets until the tokens 14 supplied from the parent buckets 11 and 12 are used up. When the tokens are used up, the child buckets 13 wait until the tokens 14 are transmitted from the parent buckets 11 and 12. That is, the parent buckets 11 and 12 support a work conserving mode by transmitting unused tokens of child buckets to other child buckets requiring them, thereby increasing a usage rate of a network bandwidth.

The network scheduler according to an embodiment of the present invention maintains a basic data rate of an NSU by using the above-described token bucket algorithm. That is, NSUs that do not select the work conserving mode limit network bandwidths by using only the token bucket algorithm. The network scheduler selectively supports the work conserving mode for the respective NSUs by using the token bucket algorithm.

State determining factors for determining whether to schedule the NSUs can be classified into a token value, a work conserving (WC), and a request (RQ).

The token is used to determine whether the NSU exceeds a designated network bandwidth. That is, when the token value is positive "(+)", the network scheduler determines that the NSU does not exceed the designated bandwidth. On the other hand, when the token value is negative "(−)", the network scheduler determines that the NSU exceeds the designated bandwidth.

The WC is used to determine whether the corresponding NSU has selected the work conserving mode. When the WC is "on", the network scheduler determines that the NSU has selected the work conserving mode. On the other hand, when the WC is "off", the network scheduler determines that the NSU does not select the work conserving mode, so that the NSU can use only the designated bandwidth.

The RQ is used to indicate whether the NSU has a packet request to be processed. When the RQ is "on", the network scheduler determines that the NSU has the packet request to be processed, and it includes the RQ in the scheduling. On the other hand, when the RQ is "off", the network scheduler excludes the NSU from the scheduling, regardless of the existence or non-existence of the token.

The state of the NSU determined by the three state determining factors can be classified into a green state, a yellow state, a red state, and a black state. The green state represents a case where the token value is positive "(+)" and the RQ exists. The yellow state represents a case where the token value is negative "(−)", the work conserving mode is supported, and the RQ exists. The red state represents a case where the token value is negative "(−)", the work conserving mode is not supported, and the RQ exists. The black state represents a case where the RQ does not exist.

The network scheduler acquires the four states of the NSUs by using the three state determining factors for determining whether to schedule the NSUs, and supports the work conserving mode selectively and efficiently by scheduling the NSUs corresponding to the four states in accordance with the scheduling policy.

The green state represents a case where the NSU does not exceed a designated bandwidth and has a request to be processed, so that the NSU becomes a preferential scheduling target.

The yellow state represents a case where although the NSU exceeds a designated bandwidth, it selects the work conserving mode and has a request to be processed. In the yellow state, the NSU becomes a scheduling target when no NSU of the green state exists.

The red state represents a case where the NSU exceeds a designated bandwidth, it does not select the work conserving mode, and it has a request to be processed. In the red state, the NSU is excluded from the scheduling target and then is changed to the green state when the token is supplied and thus the token value becomes positive "+".

The black state represents a case where the NSU has no request regardless of the token or the selection/non-selection of the WC. In the black state, the NSU is excluded from the scheduling target.

The network scheduler according to the embodiment of the present invention preferentially processes the NSUs of the green state, and then processes the NSUs of the yellow state when no NSUs of the green state exist. In addition, the network scheduler updates the tokens whenever it processes the NSUs, and checks the remaining state determining factors to newly set the states of the NSUs.

As described above, when the network traffic is excessive, the network scheduler ensures the allocated bandwidth by using the token bucket scheme. When the network traffic is not excessive, the network scheduler enables the NSUs to use the remaining bandwidths by selectively supporting the work conserving mode for the respective NSUs serving as the network entities. The network scheduler manages the NSUs by classifying the NSUs into the green state, the red state, the yellow state, and the black state according to the token values, the selection/non-selection of the work conserving mode, and the existence/non-existence of the packet requests. The network entities are the scheduling targets of the network scheduler. The network entities may be connected to the respective networks in a general computer environment. In a virtualization environment, the network entities may be virtualization network adaptors of guest systems.

Figure 2:
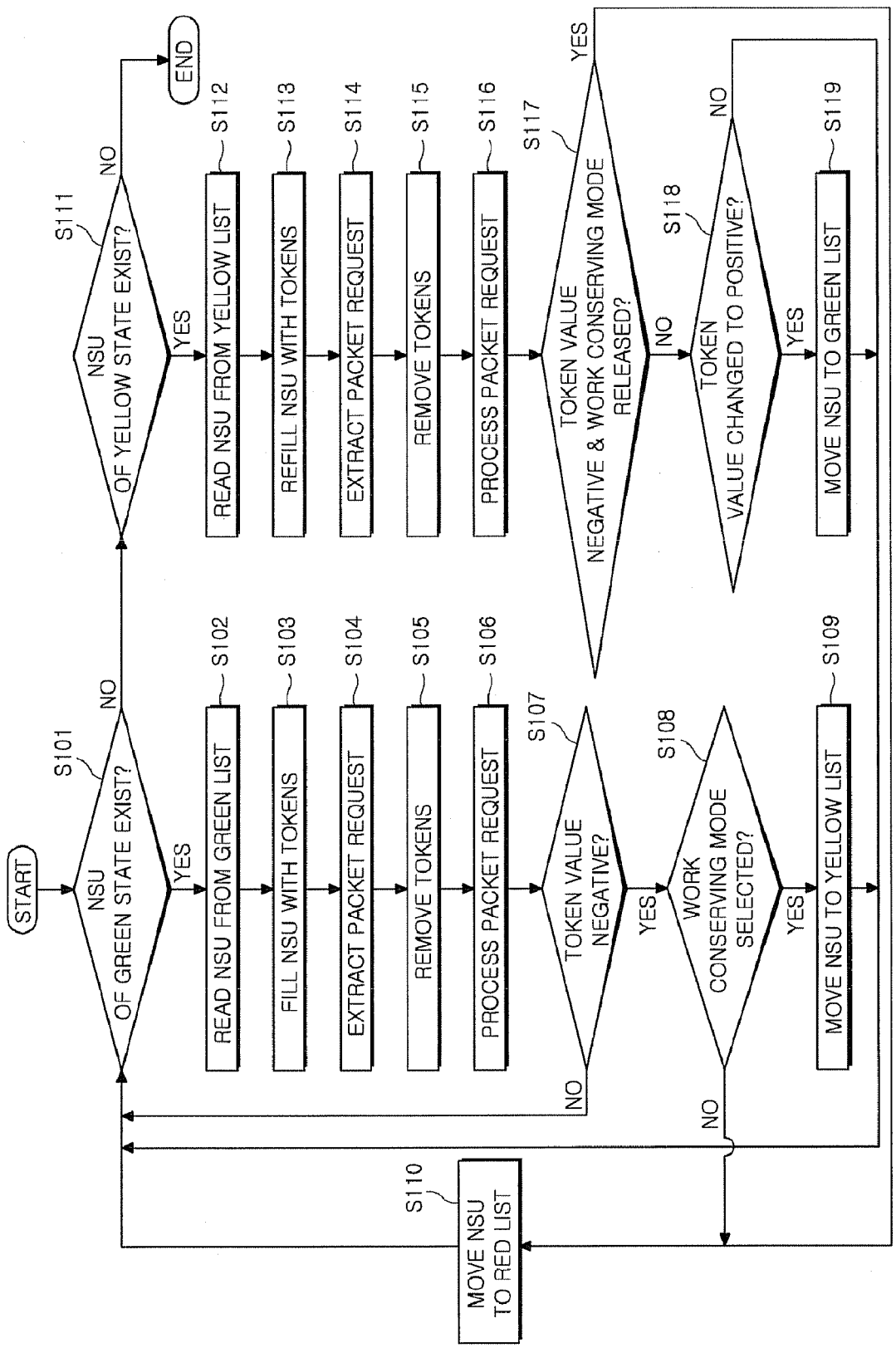
FIG. 2 is a flowchart illustrating a network scheduling method for selectively supporting a work conserving mode according to an embodiment of the present invention.

FIG. 2 is a flowchart illustrating a network scheduling method for selectively supporting a work conserving mode according to an embodiment of the present invention.

Referring to FIG. 2, when the network scheduler is enabled, it checks whether the NSU of the green state exists by referring to a green list in operation S101. The green list is a list that the NSUs of the green state are connected with one another. The green list is stored in the network scheduler.

When the NSU of the green state exists in operation S101, the network scheduler reads the corresponding NSU from the green list in operation S102. The network scheduler refills the read NSU with tokens by an elapsed time in operation S103, and extracts a packet request to process from the read NSU in operation S104. Then, the network scheduler removes as many tokens as the size of the packet request to process in operation S105, and processes the read packet request in operation S106.

When the processing of the packet request is completed, the network scheduler determines whether the token value is negative "−" in operation S107. When the token value is positive "+" in operation S107, the network scheduler maintains the NSU in the green list, as it is, without changing the state of the NSU, and returns to operation S101.

When the token value is negative "−" in operation S107, the network scheduler determines whether the NSU has selected the work conserving mode in operation S108. When the NSU has selected the network conserving mode in operation S108, the network scheduler moves the corresponding NSU to a yellow list in operation S109, and returns to operation S101. The yellow list is a list that the NSUs of the yellow state are connected with one another. The yellow list is stored in the network scheduler.

When the NSU does not select the work conserving mode in operation S108, the network scheduler moves the corresponding NSU to a red list in operation S110, and returns to operation S101. The NSU moved to the red list is refilled with the tokens at constant intervals and is moved to the green list or the yellow list according to the change of the state. The red list is a list that the NSUs of the red state are connected with one another. The red list is stored in the network scheduler.

The network scheduler repeats the above-described operations S101 through S110 to process the NSUs of the green list. When no NSUs are left in the green list, the network scheduler processes the NSUs of the yellow list as follows.

When no NSUs of the green state exist in operation S101, the network scheduler checks whether the NSU of the yellow state exists by referring to the yellow list in operation S110. When no NSU of the yellow state exists, the network scheduler terminates the network scheduling.

When no NSU of the green state exists in operation S111, the network scheduler reads the corresponding NSU from the yellow scheduler in operation S112. The network scheduler refills the read NSU with the tokens by an elapsed time in operation S113, and extracts a packet request from the read NSU in operation S114. Then, the network scheduler removes as many tokens as the size of the packet request in operation S115, and processes the read packet request in operation S116.

In operation S117, the network scheduler determines whether the token value is a negative "−" and the selected work conserving mode of the NSU is released. When the token value is the negative "−" and the selected work conserving mode is released in operation S117, the network scheduler proceeds to operation S110 to move the corresponding NSU to the red list.

When the token value is not the negative "−" and the selected work conserving mode is not released in operation S117, the network scheduler determines whether the token value changes to a positive "+" value in operation S118. When the token value changes the positive (+) value in operation S118, the network scheduler changes the corresponding NSU to the green state in operation S119.

When the NSU of the yellow list is processed through the above-described operations S111 through S119, the network scheduler returns to operation S101 to check whether another NSU of the green state exists. In this way, the network scheduler processes the NSUs of the green list and the NSUs of the yellow list.

When no packet requests are left in the NSUs, the network scheduler removes the NSUs from all the lists, regardless of the token value or the WC state, so that the NSUs change to the black state.

As described above, the network scheduler selectively supports the work conserving mode to the NSUs by using the network scheduling scheme.

According to the network scheduler and the network scheduling method described above, the network bandwidths can be efficiently managed by selectively supporting the work conserving mode to the respective network entities by using the improved token bucket scheme.

Furthermore, the efficiency of network resources can be enhanced by efficiently distributing the network bandwidths without waste, while reflecting a manager's intention, thereby improving an overall system performance.

Moreover, a manager can control a network environment by limiting the network bandwidths with respect to the respective network entities according to a user's purpose or intention The methods for limiting the network bandwidths according to the exemplary embodiments can be realized as programs and stored in a computer-readable recording medium that can execute the programs. Examples of the computer-readable recording medium include CD-ROM, RAM, ROM, floppy disks, hard disks, magneto-optical disks and the like.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A network scheduler, where
the network scheduler selectively supports a work conserving mode in network scheduling units (NSUs) serving as network entities by using a token bucket scheme, such that the network scheduler ensures an allocated network bandwidth or enables the NSUs to use a remaining bandwidth; and
the network scheduler manages the NSUs by classifying the NSUs into a green state, a red state, a yellow state, and a black state according to a token value, a selection or non-selection of the work conserving mode, and an existence or non-existence of a packet request to be processed, wherein
the network scheduler reads NSUs of the green state from a green list, refills the read NSUs with tokens, extracts packet requests from the read NSUs, and processes the extracted packet requests;
the network scheduler moves the NSUs selecting the work conserving mode to a yellow list when the token value is negative (−); and
the network scheduler maintains the NSUs in the green list without changing states of the NSUs when the token value is positive (+).

2. A network scheduler, where
the network scheduler selectively supports a work conserving mode in network scheduling units (NSUs) serving as network entities by using a token bucket scheme, such that the network scheduler ensures an allocated network bandwidth or enables the NSUs to use a remaining bandwidth; and
the network scheduler manages the NSUs by classifying the NSUs into a green state, a red state, a yellow state, and a black state according to a token value, a selection or non-selection of the work conserving mode, and an existence or non-existence of a packet request to be processed, wherein
when no NSUs of the green state exist, the network scheduler reads NSUs of the yellow state from a yellow list, refills the read NSUs with tokens, extracts packet requests from the read NSUs, and processes the extracted packet requests;

the network scheduler moves the corresponding NSUs to a red list when the selected work conserving mode of the NSUs is released and when the token value is negative (−); and the network scheduler changes the corresponding NSUs to the green state when the token value changes to positive (+) regardless of the selection or non-selection of the work conserving mode.

3. The network scheduler of claim 2, wherein the NSUs moved to the red list are refilled with the tokens at constant intervals and are moved to the green list or the yellow list according to the change of the state.

4. A network scheduling method, comprising:

reading an network scheduling unit (NSU) of a green state from a green list, refilling the read NSU with tokens, extracting a packet request from the read NSU, and processing the extracted packet request;

moving an NSU selecting a work conserving mode to a yellow list according to a token value;

reading an NSU of a yellow state from a yellow list, refilling the read NSU with tokens, extracting a packet request from the read NSU, and processing the extracted packet request;

moving the corresponding NSU to a red list or changing the corresponding NSU to the green state according to a token value and a release or non-release of the selected work conserving mode of the NSU; and moving an NSU, which do not select the work conserving mode, to a red list according to the token value.

5. The network scheduling method of claim 4, wherein the operation of reading the NSU of the green state and processing the packet request comprises:

checking whether an NSU of the green state exist by referring to the green list;

reading the NSU from the green list when the NSU of the green state exists;

refilling the read NSU with tokens, and extracting packet request from the read NSU;

removing the tokens and processing the packet request; and reading the NSU of the yellow state when no NSUs of the green state exist, and processing the packet request.

6. The network scheduling method of claim 5, wherein the read NSU is refilled with the tokens by an elapsed time.

7. The network scheduling method of claim 5, wherein the tokens are removed as many as the size of the packet request.

8. The network scheduling method of claim 5, wherein the operation of moving the NSU to the yellow list comprises:

determining whether the token value is negative (−) or positive (+);maintaining the NSU in the green list without changing state of the NSU when the token value is positive (+); determining whether the NSU selects the work conserving mode when the token value is negative (−);moving the NSU to the yellow list when the NSU selects the work conserving mode; and moving the NSU to the red list when the NSU does not select the work conserving mode.

9. The network scheduling method of claim 4, wherein the operation of reading the NSU of the yellow state and processing the packet request comprises:

checking whether the NSU of the yellow state exists by referring to the yellow list when the NSU of the green state does not exists;

terminating the network scheduling when the NSU of the yellow state does not exist;

reading the NSU of the yellow state from the yellow list when the NSU of the yellow state exists;

refilling the read NSU with tokens, and extracting the packet request from the read NSU; and removing the tokens, and processing the read packet request.

10. The network scheduling method of claim 9, wherein the read NSU is refilled with the tokens by an elapsed time.

11. The network scheduling method of claim 9, wherein the tokens are removed as many as the size of the packet request.

12. The network scheduling method of claim 9, wherein the operation of moving the NSU to the red list comprises:

determining whether the token value is negative (−) and the selected work conserving mode is released;

moving the NSU to the red list when the token value is negative (−) and the selected work conserving mode is released;

determining whether the token value changes to positive (+) regardless of the release of the work conserving mode; and moving the NSU to the green list when the token value is positive (+).

13. The network scheduling method of claim 4, further comprising moving the NSU to the green list or the yellow list according to the change of the states while the NSUs moved to the red list are refilled with the tokens at constant intervals.

14. The network scheduling method of claim 4, further comprising removing the NSUs from the red list, the yellow list, and the green list when no packet request is left in the NSU, regardless of the token value or the selection or non-selection of the work conserving mode, whereby the NSUs change to the black state.

15. A non-transitory recording medium storing a program for executing a network scheduling method comprising:

reading an network scheduling unit (NSU) of a green state from a green list, refilling the read NSU with tokens, extracting a packet request from the read NSU, and processing the extracted packet request;

moving an NSU selecting a work conserving mode to a yellow list according to a token value;

reading an NSU of a yellow state from a yellow list, refilling the read NSU with tokens, extracting a packet request from the read NSU, and processing the extracted packet request;

moving the corresponding NSU to a red list or changing the corresponding NSU to the green state according to a token value and a release or non-release of the selected work conserving mode of the NSU; and moving an NSU, which do not select the work conserving mode, to a red list according to the token value.

* * * * *